United States Patent Office 3,349,625
Patented Oct. 31, 1967

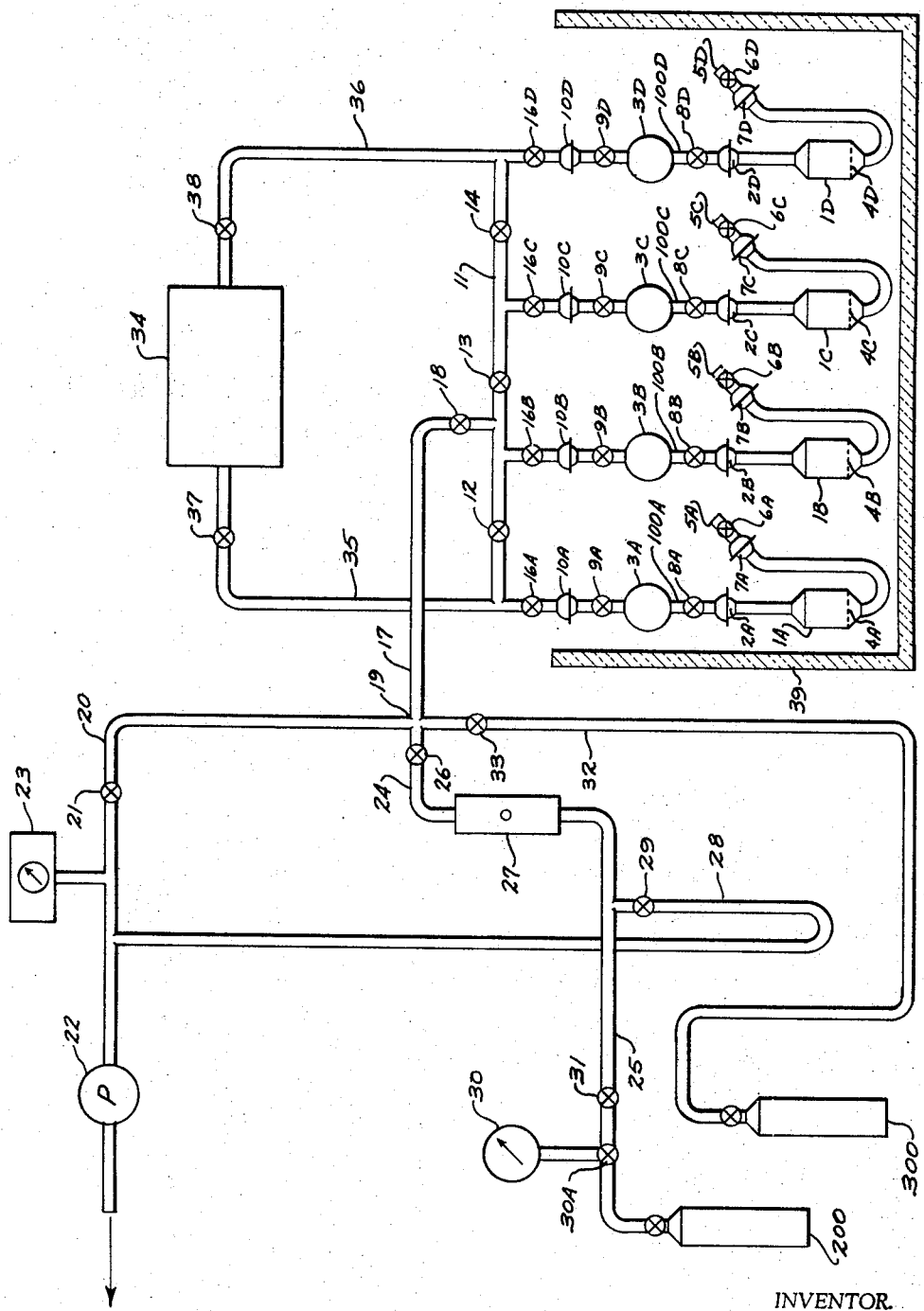

3,349,625
ADSORPTION MEASURING APPARATUS
AND METHOD
William F. Benusa and Norman D. Coggeshall, Verona, Pa., assignors to Gulf Research & Development Company, Pittsburgh, Pa., a corporation of Delaware
Filed Jan. 10, 1964, Ser. No. 336,974
7 Claims. (Cl. 73—432)

Our invention provides a method and apparatus for directly measuring chemisorption of a gas on a solid material which has both chemisorbing and physically absorbing components. In a particular embodiment, the chemisorption so measured indicates quantitatively the chemical composition of the surface of a solid catalyst, such as a supported platinum catalyst, and thus provides information useful in research on catalysts of that type and in evaluation of catalysts whose purchase and commercial application are under consideration.

Previous to the development of our invention, chemisorption on a solid material which contained both chemically and physically adsorbing components ordinarily has been measured indirectly. The reason is that chemisorption and physical adsorption occur together, and therefore it generally has been thought necessary first to measure both chemical and physical adsorption on the solid material under consideration, then to measure separately on a corresponding sample containing only the physically adsorbing components of the first sample the physical adsorption of the same gas, and finally to subtract the measurement made on the second sample from that made on the first. Not only is this double measurement inconvenient, but, in addition, it may provide results both imprecise and inaccurate. This is particularly true when, as often happens, physical adsorption is responsible for a large proportion of the total absorption—that is, of the sum of physical and chemical adsorption—for the chemisorption must then be calculated by substracting from the total adsorption (a relatively large number) the physical adsorption of the control sample (a relatively large number) to obtain the chemisorption (a relatively small number). Although differential measurements of some phenomena have been proposed for avoiding some of the difficulties mentioned above, no technique for actually accomplishing this end has been suggested.

In accordance with the present invention, the inconvenience, impreciseness, and inaccuracy of prior practice is overcome by the provision of a method and apparatus for measuring directly the chemisorptive ability of a solid material which comprises both chemisorbing and physically adsorbing components. In our method, we employ a measured first sample representative of the aforesaid solid material, that is, a "chemisorbing" sample, and a measured second sample (preferably of substantially identical magnitude) of a solid material consisting only of non-chemisorbing components of the type and in the relative proportion of those present in the first sample, that is, a corresponding non-chemisorbing or "physically adsorbing" sample. For example, if we wish to measure the chemisorption of hydrogen by the platinum component of a hydrocracking catalyst comprising platinum supported on silica-alumina, we may employ as the first sample one gram of the platinum hydrocracking catalyst and as the second sample one gram of the silica-alumina support.

Further, in accordance with the method of this invention, we contact a measured chemisorbing sample with a measured amount of chemisorbable gas in a first closed system of known constant volume, and, at the same time, we contact a measured sample of the corresponding physically adsorbing material in a second closed system of known and constant volume. These systems, preferably substantially identical, are brought to chemisorption conditions, as, for example, by heating in a furnace, to effect chemisorption on the chemisorbing sample, and the pressure difference between the systems is then measured by a suitable differential pressure-measuring device, for example, a differential oil manometer. The differential pressure so measured is indicative directly of the amount of gas chemisorbed by the first sample. This amount is in turn indicative of the ability of this sample to chemisorb gas and, when divided by the weight of the chemisorptive sample, provides as the quotient the specific chemisorptive ability of the chemisorbing sample. Under assumptions which have been established as correct for supported platinum catalysts, this information can be employed to compute the surface area of the platinum on a gram of catalyst and can be combined with BET (Brunauer-Emmett-Teller) surface-area measurement information to determine the proportion of the surface of the catalyst which is occupied by platinum, and the present invention includes such combination of measurement processes.

In accordance with the apparatus of our invention, there are provided a pair of systems of substantially constant and known volume, each comprising a reservoir of constant and known volume and a sample container of known volume. Each reservoir is connected to its respective sample container by a gas flow means, such as a length of glass tubing, which is provided with valve means, such as a stopcock for alternately connecting and isolating each such reservoir and its corresponding sample container, and conveniently with a separable fitting, such as a spherical glass joint. Each reservoir is also connected to a pressure-measuring device, for example, a mercury manometer. Additionally, each gas reservoir is provided with a gas flow means for connecting the gas reservoir to a source of chemisorbable gas, such as a cylinder of hydrogen. In each last-mentioned gas flow means is positioned a valve means, such as a stopcock, for alternately connecting and isolating said source and said reservoir.

In a preferred embodiment of our invention, the two reservoirs are interconnected by a gas flow means, such as a length of glass tubing, provided with valve means, such as a stopcock for alternately connecting and isolating said reservoirs from each other. During charging of the reservoirs with chemisorbable gas, the last-mentioned valve means is left open. When, after charging, this valve means is closed, the reservoirs will be at equal pressure. By this procedure it is assured that the amounts of chemisorbable gas employed will remain in constant ratio and that when, as we prefer, reservoirs of substantially equal volume are employed, substantially equal amounts of gas will be charged to each system. Further in accordance with the apparatus of our invention, there is provided a differential pressure-measuring means, suitably, for example, of the diaphragm, manometric, or strain-gauge types, so connected to the above-described systems as to measure the difference in pressure between them.

With brief reference to the drawing, the figure is a schematic representation of an apparatus suitable for directly measuring chemisorption of a gas on a solid material having both chemisorbing and physically adsorbing components.

Now with more detailed reference to the figure symbols 1A, 1B, 1C and 1D designated sample containers suitable for containing either chemisorbing or physically adsorbing samples in the practice of our invention. Symbols 3A, 3B, 3C and 3D denote gas reservoirs of known and constant volume, each reservoir being connected by a suitable gas-tight fitting, denoted by symbols 2A, 2B, 2C and 2D to a respective sample container. Attachment means to be suitable must prevent significant leakage of air from the ambient atmosphere to the interior of the reservoirs and sample containers and must, at the same time, allow gas flow between each reservoir and and its respective sample container. Conventional ball-and-socket ground-glass joints form suitable and convenient attachment means.

With continuing reference to the figure, symbols 4A, 4B, 4C and 4D designate sample support means, suitably fritted disks, which serve to retain the sample during preparative processing, as will appear below. Symbols 5A, 5B, 5C and 5D designate venting means, fitted with valve means, suitably stopcocks, designated by symbols 6A, 6B, 6C and 6D, for venting the respective sample chambers at appropriate times. Symbols 7A, 7B, 7C and 7D denote gas-tight fittings, such as conventional ball-and-socket ground-glass joints, which allow detachment of venting means from the main body of sample containers 1A, 1B, 1C and 1D. The venting means are used during sample preparation as, for example, during pretreatment of the sample with flowing hydrogen. When the gas being vented is explosive, venting means 5A, 5B, 5C and 5D are advantageously provided with venting hoses, not shown, to conduct the explosive gas away to a safe place.

Symbols 100A, 100B, 100C and 100D denote gas flow means, which connect the reservoirs to their respective sample containers. Symbols 8A, 8B, 8C and 8D designate valve means, suitably stopcocks, for example, for closing off gas flow in, respectively, gas flow means 100A, 100B, 100C and 100D during charging of the reservoirs with gas, and for connecting reservoirs 3A, 3B, 3C and 3D to their corresponding sample containers 1A, 1B, 1C and 1D during the sorption phase of the cycle.

Symbols 9A, 9B, 9C and 9D designate valve means, suitably stopcocks. Said valve means are in the open position during charging and evacuation of the gas reservoirs and during interconnection of the reservoirs with the differential pressure-sensing means to be described below. Symbols 10A, 10B, 10C and 10D denote attachment-detachment means, which may be of the same type as attachment-detachment means 2A, 2B, 2C and 2D and which form gas-tight connections between the reservoirs and the sources of gas and between the reservoirs and the differential pressure-sensing means.

It will be appreciated that each reservoir and the respective sample container to which it is connected constitute a system of known, substantially constant volume. For example, the volume of reservoir 3A is defined by its walls, valve means 8A and valve means 9A.

The use of substantially constant volume systems coupled with measurement of pressure differential between, in accordance with the present invention, is especially advantageous in that it renders the method and apparatus particularly constantly sensitive, accurate, and adaptable to automation. In differential pressure-measuring apparatus, high and essentially constant sensitivity is attainable over large ranges of differential pressure so that the differential pressure-measuring device requires no attention or adjustment of sensitivity between one measurement and the next, thus rendering the method and apparatus of the present invention easily adaptable to automation. Moreover, with apparatus of the highly developed differential pressure-measuring art, readings are obtained which are continuous functions of the differential pressure being measured. In contrast, volume-change measurements have been fraught with problems of highly variable sensitivity and inaccuracy. This highly variable sensitivity sometimes necessitates readjustment of the volume-measuring apparatus after each measurement, thus rendering this apparatus unsatisfactory for automatic operation. Moreover, apparatus for volume-change measurement have produced step-function outputs, only approximating the volume changes whose measurement has been sought. These disadvantages, highly variable sensitivity and inaccuracy, have not been corrected because measures taken to reduce the one have increased the other and vice versa.

Attempts to measure volume changes in terms of concentration have also encountered difficulty, especially with respect to adaptation to automation, for they involve measurement of a differential change which takes place over a period of time. Such changes are recorded as broad, short peaks on recording charts, which are difficult to integrate accurately. Differential pressure-measurement on the other hand, which is employed in the method and apparatus of the present invention, is easily adapted to automation.

The sizes of the reservoirs and sample containers are chosen to provide a conveniently measurable pressure decrease during sorption of gas by the samples. This pressure decrease will be dependent on the magnitude of the samples of solid materials whose chemisorptive abilities are to be measured, on the specific sorptive (both physically adsorptive and chemisorptive) ability of the said material for the gas being sorbed, on the amount of gas initially charged to the reservoirs, and on the sum of the volumes of the sample containers and their respective reservoirs. For example, in studies of supported platinum catalysts, one gram samples of catalyst and of catalyst support have been employed with satisfactory results in sample containers of 10 ml. volume associated with gas reservoirs of 10 ml. volume filled with hydrogen initially at 200 mm. Hg pressure at ambient temperature (20° C.). The catalysts of these studies had specific sorptive capacities of the order of about 10 micromoles of hydrogen per gram at sorptive conditions pertaining in the system [2 hours at 250° C. followed by reduction in temperature to ambient (20° C.) before measurement of differential pressures between reservoir-sample container systems]. The amount of hydrogen charged to each reservoir was therefore about 110 micromoles. Sorption, then, resulted in a pressure decrease of the order of 10 mm. Hg, an order of magnitude easily measured manometrically.

It will be appreciated, of course, that the value measured in the method of this invention is a pressure difference between two sample container-reservoir systems and that this difference will generally be less, and may be much less, than the greater of the pressure decreases brought about by sorption in each of the systems.

Numeral 11 designates a valved manifold which provides for connecting closed, constant volume, reservoir-sample container systems 1A–3A, 1B–3B, 1C–3C, and 1D–3D to, in succession, evacuating means 22, source of chemisorbable gas 200, source of inert gas 300, and differential pressure-measuring means 34. Numerals 12, 13, 14, 16A, 16B, 16C, 16D and 18 denote valve means, suitably stopcocks, by which the desired of the said connections is accomplished. Thus, for example, for evacuating systems 1A–3A, 1B–3B, 1C–3C and 1D–3D, valve means 8A, 8B, 8C, 8D, 9A, 9B, 9C, 9D, 16A, 16B, 16C, 16D, 12, 13, 14, and 18 will be in "open" position whereas valve means 6A, 6B, 6C and 6D will be in closed position. For charging reservoirs, 3A, 3B, 3C and 3D with chemisorbable gas, valve means 6A, 6B, 6C, 6D, 8A, 8B, 8C and 8D will be in closed position while the other abovesaid valves are in their open positions. For measuring the differential pressure between, for example, systems 1A–3A and 1B–3B, valve means 6A, 6B, 12, 16C, 16D and 18 will be closed whereas valve means 8A, 8B, 9A, 9B, 16A, 16B, 13 and 14 (and 37 and 38 described below) will be open.

Numerals 35 and 36 designate branches of manifold 11 which connect manifold 11 to differential pressure-measuring means 34. Numerals 37 and 38 denote valve means, such as stopcocks, by which the differential pressure-measuring means 34 may be isolated from the remainder of the apparatus when the differential pressure-measuring means is not in use.

Differential pressure-measuring means 34, referred to above, may be of any type suitable for the differential pressure range encountered in carrying out the method of the invention. This differential pressure will always be less than the highest absolute pressure in the systems, 1A–3A, 1B–3B, 1C–3C and 1D–3D, and will generally be less than about 25 mm. Hg. Commercial differential pressure-measuring devices, such as Sanborn Differential Pressure Transducer No. 613 DMS2 together with Sanborn Transducer Amplifier and Indicator Model 311, manufactured by the Sanborn Company of Waltham, Mass., are conveniently employed, but simple differential pressure-measuring devices assembled from standard laboratory equipment, for example, a differential oil manometer or a differential mercury manometer, are also employed with satisfactory results. If the differential pressure-measuring means employed effects during measurement (or effects measurement by virtue of) a change in the volume of each of the systems with which it is connected, then such change in volume should be insignificant with respect to the total volume of each of the systems, so that the volume of the systems remains substantially constant. Particularly, such change in volume should not exceed a value corresponding to the smallest differential measuring instrument sensitivity acceptable for chemisorption measurements for which the apparatus embodying the instant invention is designed.

Evacuating means 22 is suitably an oil diffusion pump backed by a mechanical pump. Numeral 23 refers to a vacuum gauge, such as a cold cathode discharge gauge, which functions to determine whether the apparatus is leak-proof and whether during evacuation of samples in sample containers 1A, 1B, 1C, and 1D all adsorbed gas has been removed.

Numeral 17 denotes a conduit means, a branch of manifold 11, connecting manifold 11 to the gas charging and evacuation sections of the system; numeral 19 denotes a conduit gas flow interconnection means; numeral 20 denotes a conduit means connecting in gas flow relation evacuating means 22 and vacuum gauge 23 through branch 17 to manifold 11. Numeral 21 denotes valve means, suitably a stopcock, for controlling gas flow in conduit means 20. Conduit means 17 and 20 together with manifold 11 allow evacuating means 22 to remove gases from systems 1A–3A, 1B–3B, 1C–3C and 1D–3D, and vacuum gauge 23 to measure the degree of evacuation in those systems.

Numeral 200, briefly referred to above, designates a source of chemisorbable gas, for example, a cylinder of chemisorbable gas, for use in the practice of the invention. The nature of the chemisorbable gas will depend on the type of solid material whose chemisorptive ability is to be determined. Both hydrogen and carbon monoxide are frequently employed as chemisorbable gases. For determining the chemisorbing ability of supported platinum catalysts, hydrogen is very suitable.

Numeral 27 denotes a flow-measuring means, for example, a Flowrotor, manufactured by Fischer-Porter, Warminster, Pa. Numeral 25 designates a conduit means connecting gas source 200 to flow-measuring means 27. Numeral 24 denotes a conduit means connecting flow-measuring means 27 to conduit intersection region 19. Numeral 26 represents a valve means, suitably a stopcock, for controlling flow through conduit 24. Numeral 30 designates a gauge for measuring the delivery pressure of chemisorbable gas from its source, for example, from a high-pressure cylinder. Numeral 30A designates an adjustable valve associated with gauge 30 for adjusting the delivery pressure of chemisorbable gas. Valve 30A and gauge 30, in concert, allow said delivery pressure to be adjusted to a desired value. Numeral 31 designates a flow control valve means, such as the SS 4M Nupro Metering Valve, marketed by Fogleman Company, Inc., for fine control of gas flow in conduit 25. Fine control valve 31 and flow-measuring means 27, in concert, allow adjustment and control of rate of gas flow in conduit 24. Conduits 25 and 24 along with flow-measuring means 27 and valve means 26 and 31 provide a gas-flow path by which chemisorbable gas is charged to manifold 11 and thence to systems 1A–3A, 1B–3B, 1C–3C and 1D–3D for sample pretreatment or to reservoirs 3A, 3B, 3C and 3D preparatory to measurement of chemisorptive ability of solid materials.

Numeral 28 designates a pressure-measuring means, suitably a mercury manometer, for determining the pressure of chemisorbable gas in reservoirs 3A, 3B, 3C and 3D. Together with the known volumes of the reservoirs, this pressure indicates (by the gas law) the amount of gas in each reservoir. Numeral 29 denotes a valve means, suitably a stopcock, for controlling access to pressure-measuring means 28.

Numeral 32 designates a conduit means connecting a source designated by numeral 300, of an inert, non-sorbable gas, suitably helium, to interconnection fitting 19 and thence to manifold 11 and systems 1A–3A, 1B–3B, 1C–3C and 1D–3D. Auxiliary elements, not shown, are provided in conduit means 32 to correspond to flow-measuring means 27, pressure-measuring means 28, pressure gauge 30, and valve means 30A and 31 in conduits 24 and 25. The inert gas supply system is therefore essentially similar to the chemisorbable gas supply system. Numeral 33 designates a valve means controlling flow in conduit means 32.

Numeral 39 designates a furnace, for example, an electric furnace whose temperature may be regulated by means not shown. The furnace is withdrawn, by means not shown, from the region of systems 1A–3A, 1B–3B, 1C–3C and 1D–3D when these systems are to be cooled, assembled or disassembled.

For purposes of illustration, the operation of the apparatus of the figure will be described in terms of the determination of the chemisorptive ability of three supported platinum reforming catalysts, the support for each catalyst being the same alumina. In addition, the calculation of the platinum surface area of one of these catalysts will be described. Sample tubes 1A, 1B, 1C and 1D are detached from reservoirs 3A, 3B, 3C and 3D and into each of sample tubes 1A, 1B and 1C is weighed a one gram sample of the appropriate catalyst. A one gram sample of the catalyst support is weighed into sample tube 1D. Next, the sample tubes are connected to their respective reservoirs and the outlet stopcocks 6A, 6B, 6C and 6D on the sample tubes are closed. Furnace 39 is then moved into position. With valves 30A, 31, 29 and 26, and corresponding valves (including valve 33) in the helium supply system closed, and valves 21, 37 and 38 closed, and with valves 8A, 8B, 8C, 8D, 9A, 9B, 9C, 9D, 16A, 16B, 16C, 16D, 12, 13, 14 and 18 open, valve 21 is carefully opened to evacuate reservoirs 3A, 3B, 3C and 3D and sample tubes 1A, 1B, 1C and 1D, oil diffusion pump 22 having been placed into operation.

Electric furnace 39 is then turned on and its temperature adjusted to 500° C. The apparatus is then left in this condition for two hours so that adsorbed vapors are completely removed from the supported catalyst samples in sample tubes 1A, 1B and 1C and from catalyst support in sample tube 1D.

After this two hour evacuation of the sample tubes 1A, 1B, 1C and 1D, stopcock 29 is opened to connect manometer 28 to the hydrogen inlet system and stopcock 21 is closed to isolate the vacuum pumping system from the sample container-reservoir system. Next, stopcock 26 is opened in hydrogen delivery line 24, and valve 30A is adjusted to give a hydrogen delivery pressure of three pounds per square inch as indicated on gauge 30. Fine control valve 31 is opened. Hydrogen is allowed to flow into the system until it reaches atmospheric pressure, as indicated by manometer 28. At that point, sample tube outlet stopcocks 6A, 6B, 6C and 6D are opened and fine control valve 31 is adjusted to provide a hydrogen flow of 25–50 cc. per minute, as measured on flow-measuring device 27. Advantageously during this reduction of the catalyst samples, vent hoses (not shown) are provided on vent tubes 5A, 5B, 5C and 5D of sample containers 1A, 1B, 1C and 1D.

Reduction of the samples continues in this way for two hours, the temperature of the furnace remaining at 500° C. After that, outlet stopcocks 6A, 6B, 6C and 6D are closed and immediately thereafter fine control valve 31 is closed, as are stopcock 26, stopcock 29 and valve 30A. Then stopcock 21 is carefully opened to avoid damage by a pressure surge to the reservoir-sample container system. This system is then evacuated until a pressure lower than $10^{-4}$ millimeters of mercury is read on gauge 23. (If such pressure is not attained within a reasonable time, the reduction described above should be repeated and evacuation to $10^{-4}$ millimeters of mercury attempted again.) As soon as evacuation to $10^{-4}$ millimeters is successful, stopcocks 8A, 8B, 8C and 8D on reservoirs 3A, 3B, 3C and 3D are closed.

Furnace 39 is turned off and removed from sample tubes 1A, 1B, 1C and 1D to allow the sample-reservoir system to attain ambient temperature, and stopcock 26 in hydrogen line 24 is opened, and stopcock 29 is opened to connect manometer 28 to the hydrogen delivery system. Valve 30A is then adjusted to provide a hydrogen delivery pressure at three pounds per square inch, as indicated on gauge 30, and stopcock 21 is closed. Fine control valve 31 is opened to allow hydrogen to flow until a pressure of 200 millimeters mercury is read on manometer 28, whereupon stopcock 26 is closed as are also valves 30A and 31, to prevent further flow of hydrogen into the system. Stopcock 29 may be closed to protect manometer 28 from accident. At this point, pressure in reservoirs 3A, 3B, 3C and 3D is equal at 200 millimeters of mercury. Stopcocks 9A, 9B, 9C and 9D are then closed to isolate reservoirs 3A, 3B, 3C and 3D from intercommunication with one another.

Stopcocks 8A, 8B, 8C and 8D are next opened to secure gas-flow communication between reservoirs 3A, 3B, 3C and 3D and their respective sample containers 1A, 1B, 1C and 1D. To complete chemisorption of hydrogen, furnace 39 is moved into place around sample tubes 1A, 1B, 1C and 1D, and the temperature in furnace 39 is adjusted to 250° C. The apparatus is left in this condition for two hours to complete chemisorption. After this, furnace 39 is again lowered away from sample containers 1A, 1B, 1C and 1D, and thus the samples in sample containers 1A, 1B, 1C and 1D are allowed to reach ambient temperature.

The temperature of chemisorption, 250° C., has been found to give useful information about platinum on supported platinum catalysts, the chemisorption at this temperature in the pressure range employed corresponding to about one atom of chemisorbed hydrogen per atom of surface platinum. Carbon monoxide is usefully employed at lower temperature. Still lower temperature may be adequate for other types of chemisorptive reactions. For example, chemisorption of carbon dioxide on potassium oxide has been achieved at a temperature of $-78.5°$ C.

The differential measurement characterizing the chemisorptive ability of the samples may be carried out at the temperature of chemisorption. Because, however, the chemisorption is for all practical purposes irreversible at ambient temperature, it is convenient and permissible to measure chemisorption at ambient temperature.

Stopcock 21 is opened, evacuation means 22 being in operation. When a pressure of less than $10^{-4}$ millimeters mercury, as read on gauge 23, has been achieved, stopcock 21 is closed, and the desired series of differential pressure measurements is begun.

In the apparatus depicted in FIGURE 1, the volume of conduits 35 and 36 and of manifold 11 and of other interconnecting conduits is insignificant with respect to the volume of reservoirs 3A, 3B, 3C and 3D and sample containers 1A, 1B, 1C and 1D. If, in equivalent apparatus, volumes of interconnecting lines are not insignificant, such volumes may be taken into account in the interpretation of the results of the differential pressure measurement. However, such interpretation is simplified when the apparatus of our invention is so constructed as to provide interconnecting conduit means of volume insignificant with respect to the volumes of the reservoirs and sample containers.

To characterize the catalyst sample in sample container 1A with respect to the support sample in sample container 1D, stopcocks 18, 12, 13 and 14 are closed; then stopcocks 9A and 9D are opened, and finally stopcocks 37 and 38 are simultaneously opened. This results in a differential pressure reading on differential pressure-measuring device 34, and this reading may be recorded automatically or manually.

To prepare for a subsequent differential pressure determination, stopcocks 37, 38, 16A and 9A are closed.

When, as in the apparatus of the figure, the volume of conduits 35 and 36, of manifold 11, and of other interconnecting conduits is insignificant with respect to the volume of reservoirs 3A, 3B, 3C and 3D and sample containers 1A, 1B, 1C and 1D, a subsequent differential pressure determination may be undertaken without intermediate operations. When, on the other hand, the volume of interconnecting conduits such as 35 and 36 and manifold 11 is not insignificant with respect to the volume of reservoirs and sample containers, then advantageously the conduits which will connect the differential pressure-measuring means to the catalyst sample container-reservoir system to be employed in the subsequent differential pressure determination are evacuated. In apparatus that functions in the same manner as that of the figure, but that has significantly voluminous interconnecting conduits, such evacuation can be accomplished by opening valves corresponding to stopcocks 12, 18 and 21 and operating evacuation means corresponding to vacuum pump 22. After the evacuation, valves corresponding to stopcocks 12, 18 and 21 are closed. Inasmuch as the volume of conduits 35 and 36 and of manifold 11 and of other interconnecting conduits is insignificant with respect to the volume of the reservoirs and sample containers of the figure, no further reference will be made to evacuation of interconnecting conduits between differential pressure measurements.

To determine the differential pressure between sample container-reservoir system 1B–3B, sample container-reservoir system 1D–3D, stopcocks 9B and 12 are opened. Then, stopcocks 37 and 38 are simultaneously opened to provide a differential pressure reading on gauge 34. This reading may be recorded manually or automatically. To prepare for a subsequent differential pressure reading, valves 37 and 38 are closed and stopcocks 16B and 9B are closed.

To characterize the catalyst sample in sample container 1C with the catalyst support sample in sample container 1D, stopcock 9C is opened and stopcock 13 is opened. Then, stopcocks 37 and 38 are simultaneously opened to provide a differential pressure reading on differential pressure-sensing means 34. This reading is recorded automatically or manually.

For a more nearly exact determination of chemisorptive ability, the differences in intrinsic densities of the catalyst (and hence differences in dead space in their respective systems) may be taken into account. To prepare catalyst and catalyst support samples in sample containers 1A, 1B, 1C and 1D, stopcocks 37 and 38 are closed, and stopcocks 14, 18, 16A, 16B, 9A, 9B and 21 are opened. Furnace 39 is moved into place and adjusted to 500° C. The evacuating means 22 is placed in operation.

When a pressure lower than $10^{-4}$ millimeters has been attained as indicated by gauge 23, stopcock 21 and stopcocks 8A, 8B, 8C and 8D are closed. The differential pressure resulting from interaction of the samples with helium supplied through line 32 controlled by stopcock 33 is determined in a manner exactly analogous to that described above for hydrogen. As in the above-described procedure for hydrogen, reservoirs 3 should be initially pressured to 200 millimeters of mercury.

In one instance when one gram of a platinum-on-alumina catalyst was in sample tube 1A and one gram of its support was in sample tube 1D, differential hydrogen and helium pressure readings determined as described above were 9.69 millimeters and 0.50 millimeter of mercury, respectively, in each instance the pressure in reservoir 3A exceeding that in 3D. The helium reading reflects, of course, a difference between the volumes of the catalyst and catalyst support samples corresponding to one gram, that is, the difference in their densities. The difference between these differential pressure readings, 9.19 millimeters, may be multiplied by the sum of the volume of reservoir 3A and the volume of sample container 1A, in this instance the sum being 20 milliliters, and that product divided by the product of the gas constant (in appropriate units) and the absolute ambient temperature (in this instance 293.2° K.) to give the specific chemisorption of hydrogen per gram of catalyst, namely 10.07 micromoles per gram. This is attributable to the platinum alone.

Because each surface atom of platinum is associated with a single hydrogen atom, the platinum surface area may be computed from the above-described measurement and the known density of platinum. In particular, this area in square meters per gram is determined by multiplying the specific adsorption due to platinum (micromoles per gram) by 0.1073. For the catalyst described above, this gives a platinum surface area of 1.08 square meters per gram.

It will be apparent that the method and apparatus of the instant invention, disclosed primarily in terms of measurement of the specific chemisorptive ability of solid materials, will also serve for any differential characterization of one solid material with respect to another whenever that characterization is accomplished by interaction of the solid materials with a gas.

Our invention is not to be construed as limited by the embodiment we have described above, but is limited only as defined explicitly or simplicity in the appended claims.

We claim:

1. A method for determining directly the chemisorptive ability of a solid material comprising chemisorbing and physically adsorbing components, the method comprising (1) contacting a measured first sample of solid material in a closed system of known, substantially constant volume with a measured amount of chemisorbable gas so as to effect both chemisorption and pysical adsorption of said by the sample, contacting in like manner in a second closed system of known, substantially constant volume with a second measured amount of the same chemisorbable gas a second measured sample of a second solid material consisting essentially of non-chemisorbing components of the same kind and in the same relative proportions as in the first sample so as to effect physical adsorption of said gas by the sample, and (2) measuring the difference in gas pressure between the first closed system and the second closed system, the difference in gas pressure so measured being indicative of the amount of gas chemisorbed by the first sample, the amount of gas chemisorbed being, in turn, indicative of the chemisorptive ability of the first solid material.

2. A method for determining directly the specific chemisorptive ability of a first solid material comprising chemisorbing and physically adsorbing components, the method comprising (1) contacting a weighed first sample of said first solid material in a first closed system of known, substantially constant volume with a first measured amount of both chemisorbable gas so as to effect both chemisorptione and physical adsorption of said gas by the sample, and contacting a second sample of a second solid material in like manner in a second closed system of volume substantially equal to that of said first closed system, with a second measured amount of the same chemisorbable gas, this second amount being substantially equal to the first measured amount of this gas, said second sample having a weight substantially equal to that of the first sample and consisting essentially of non-chemisorbing components of the same kind and in the same relative proportions as in the first sample so as to effect physical adsorption of said gas by the sample, and (2) measuring the difference in gas pressure between the first closed system and the second closed system, the difference in gas pressure so measured being indicative of the amount of gas chemisorbed per unit weight of the first sample, this amount of gas, in turn, being indicative of the chemisorptive ability per unit weight of the first solid material.

3. The method of claim 2 where the first solid material is a supported platinum catalyst and the second solid material consists of the support material.

4. A method for determining directly the specific chemisorptive ability of a solid material comprising chemisorbing and physically adsorbing components, the method comprising (1) so contacting a weighed first sample of the solid material in a closed system of known, substantially constant volume with a first measured amount of chemisorbable gas as to effect chemisorption of said gas by the sample, (2) contacting a second sample in like manner in a second closed system of volume substantially equal to that of said first closed system with a second measured amount of the same chemisorbable gas, this second amount being substantially equal to the first measured amount of the same chemisorbable gas, said second sample having a weight substantially equal to that of the first sample and consisting essentially of non-chemisorbing components of the same kind and in the same relative proportion as in the first sample, (3) measuring the difference in gas pressure between the first closed system and the second closed system, (4) contacting the first sample in the first closed system with a first measured amount of non-sorbable gas, (5) contacting in like manner the second sample in the second closed system with a second measured amount of the same non-sorbable gas, this second amount being substantially equal to the first measured amount of this gas, and (6) measuring the difference in gas pressure between the first closed system and the second closed system, this difference and the difference measured in step (3), taken in concert, being indicative of the chemisorptive ability per unit weight of the solid material.

5. The method of claim 4 where the chemisorbable gas is hydrogen and the non-sorbable gas is helium.

6. A method for determining directly the specific chemisorptive ability of a first solid material comprising chemisorbing and physically adsorbing components, the method comprising (1) separating a mass of chemisorbable gas into two portions of equal pressure and substantially equal volume, (2) contacting a weighed first sample of said first solid material in a first closed system with the first of the said portions of chemisorbable gas so as to effect both chemisorption and physical adsorption of said gas by the sample, and contacting in like manner in a second closed system of volume substantially equal to that of the first closed system the second said portion of chemisorbable gas with a second sample of weight substantially equal to that of the first sample and consisting essentially of non-chemisorbing components of the type and relative proportion of those present in the first sample so as to effect physical adsorption of said gas by the sample, and (3) measuring the difference in gas pressure between the first closed system and the second closed system, the difference in gas pressure so measured being indicative of the amount of gas chemisorbed per unit weight of the first sample, this amount of gas, in turn, being indicative of the chemisorptive ability per unit weight of the first solid material.

7. Apparatus for determining directly the chemisorptive ability of a solid material comprising chemisorbing and physically adsorbing components, the apparatus comprising two closed systems of substantially constant volume, a first gas flow means connecting the systems and adapted to permit pressure equilibration between the systems, a pressure-measuring means connected to said gas flow means and adapted to measure the said equilibration pressure therefor between said systems, valve means for closing off the gas flow means thereby isolating said systems from each other and a differential pressure-sensing means connected to each said system and adapted to sense the differential pressure between the systems while said systems are isolated from each other, each system comprising (1) a closed gas reservoir of known volume connected to said first gas flow means, (2) a closed sample container of known volume and adapted to contain a sample of solid material, (3) second gas flow means connecting the reservoir and the sample container and adapted to facilitate rapid flow of chemisorbable gas from the said gas reservoir to the said sample container and subsequently chemisorption of said gas upon said sample, (4) valve means positioned in the second gas flow means for alternately connecting and isolating said reservoir and said sample container, (5) a third gas flow means for connecting a source of gas to said first gas flow means, and (6) valve means positioned in said third gas flow means for alternately connecting and isolating said source and said reservoir.

References Cited

UNITED STATES PATENTS

| | | | |
|---|---|---|---|
| 3,059,478 | 10/1962 | Coggeshall et al. | 73—432 |
| 3,203,252 | 8/1965 | Poinski et al. | 73—432 |
| 3,222,133 | 12/1965 | Ballou et al. | 23—230 |

FOREIGN PATENTS

| | | |
|---|---|---|
| 1,057,798 | 5/1959 | Germany. |

OTHER REFERENCES

Gruber: "An Adsorption Flow Method . . . ," published in Analytical Chemistry, vol. 34, No. 13, December 1962, pages 1828–1829, 1830, 1831.

Article—Haul et al.—Published in Chemie-Ingtechn, August 1963, pages 586–589.

JAMES J. GILL, *Primary Examiner.*

RICHARD QUEISSER, *Examiner.*

C. A. RUEHL, *Assistant Examiner.*

UNITED STATES PATENT OFFICE
CERTIFICATE OF CORRECTION

Patent No. 3,349,625                                October 31, 1967

William F. Benusa et al.

It is hereby certified that error appears in the above numbered patent requiring correction and that the said Letters Patent should read as corrected below.

Column 9, lines 48 and 51, after "a", each occurrence, insert -- first --; line 50, after "of" insert -- said first --; line 53, for "pysical" read -- physical --; line 54, after "sample," insert -- and --; same column 9, line 75, and column 10, line 1, for "chemisorptione" read -- chemisorption --; column 10, line 65, after "sample" insert -- of a second said material --.

Signed and sealed this 18th day of February 1969.

(SEAL)
Attest:

Edward M. Fletcher, Jr.                            EDWARD J. BRENNER

Attesting Officer                                           Commissioner of Patents